Patented Nov. 20, 1923.

1,474,507

UNITED STATES PATENT OFFICE.

ARTHUR E. BARNARD, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF RECOVERING RESIDUAL ANTHRAQUINONE FROM A SULPHONATION MASS.

No Drawing.   Application filed August 18, 1921.   Serial No. 493,489.

*To all whom it may concern:*

Be it known that I, ARTHUR E. BARNARD, a citizen of the United States, and a resident of Wilmington, in the county of New Castle and State of Delaware, have invented a certain new and useful Process of Recovering Residual Anthraquinone from a Sulphonation Mass, of which the following is a specification.

This invention relates to a process of recovering unchanged anthraquinone from a reaction mass resulting from the sulphonation of anthraquinone, and comprises bringing about crystallization of the residual anthraquinone in such a way as to form relatively large crystals and to facilitate the recovery of the anthraquinone in a pure condition.

It is a well known fact that when anthraquinone is sulphonated the total anthraquinone content of the charge is not acted upon by the oleum. The recovery of this unsulphonated anthraquinone is therefore highly important.

According to the patent literature and information at hand, the usual method for recovering residual anthraquinone is to drown the sulphonation charge in a large volume of hot or cold water and to remove the precipitated anthraquinone by filtration. By this "drowning" method the crystals are so small that aggregates of fine crystals occlude free sulphuric and sulphonic acids which cannot be removed by washing with water and caustic soda in the filter press. The time required for filtration and washing is twelve to fifteen hours. At the end of this period, it is necessary to re-digest the residual anthraquinone in boiling water containing caustic soda in order to render the anthraquinone neutral to litmus and to remove the last traces of acid.

The new "crystallization" method which I have developed involves the addition of water to the sulphonation mass at a temperature for example of from 70° to 130° C., either directly or after a sufficient amount of concentrated sulphuric acid (or monohydrate) has been added so that the ratio of sulphuric acid to dissolved anthraquinone is about three to one by weight. The excess of acid in the latter case acts as a carrier for the anthraquinone to facilitate agitation, and also, by retarding crystallization, to furnish larger crystals. At 102° C. the solubility of anthraquinone is 35% in 100% sulphuric acid and 1.3% in 85% sulphuric acid. Water is added during a period of two hours at a rate sufficient to decrease the strength of acid about 5% during each of the first three thirty minute periods. Since the major portion of the anthraquinone has now been crystallized out, the acid concentration is then reduced to 75% during the final thirty minute period.

My process may be illustrated in detail by the following example:—

At the end of the sulphonation period in which 800 pounds of anthraquinone are sulphonated with 800 pounds of 30% oleum, the heating is discontinued and 31.5 pounds of water are added slowly to the rapidly agitated mixture during a period of twenty minutes to destroy the free sulphur trioxide. The charge is then blown to an intermediate crystallizing tank and the addition of water continued during a period of two hours at the following rate:—

First 30 minute period, 39 lbs. of water, 95% sulphuric acid; second 30 minute period, 42 lbs. of water, 90% sulphuric acid; third 30 minute period, 48 lbs. of water, 85% sulphuric acid; fourth 30 minute period, 114.5 lbs of water, 75% sulphuric acid.

The temperature of the charge is held at 110° C. during the crystallization. The charge is then drowned under vigorous agitation in 800 gallons of water and the precipitated residual anthraquinone is recovered by means of a filter press. The mother liquor, containing the sulphonation products, is removed by washing the residual anthraquinone in the filter press with water until the wash liquor is colorless and neutral to litmus. The residual anthraquinone is then dried at 90° to 95° C.

This process has the following advantages:—

1. It produces large crystals of residual anthraquinone which have the same or higher purity than the original anthraquinone used, providing the latter does not contain sand or other insoluble impurity that could build up as the anthraquinone content becomes exhausted through resulphonation. Under the drowing method the purity of the residual anthraquinone is five to seven per cent lower.

2. The speed of the residue filtration is four times as rapid under the new crystallization method as it is with the drowning method.

3. The occluded sulphonic and sulphuric acids can be removed by washing in the filter press, whereas with the drowning method sulphonic acid equivalent to three per cent of the weight of the residue is occluded in the aggregates of small crystals.

4. The higher purity of residual anthraquinone results in an increased yield of sulphonic acid on resulphonation.

5. The nature of the crystallized residual anthraquinone facilitates the drying operation. The time required for the drying operation is approximately one-fourth of the time heretofore required.

6. It is not necessary to use a caustic wash to remove the last traces of acid in the residual anthraquinone.

The crystallization method may be used successfully in any sulphonation reaction in which residual anthraquinone is to be recovered at the end of the sulphonation period.

It will be understood that, although I have described in great detail the preferred conditions of operation, these conditions may be varied widely without departing from the scope of my invention.

I claim:—

1. The process of recovering residual anthraquinone from a sulphonation reaction mass which comprises treating the sulphonation mass with concentrated sulphuric acid (or monohydrate) until the ratio of sulphuric acid to dissolved anthraquinone is about three to one by weight, diluting the mixture slowly with water until the sulphuric acid concentration is about 75%, drowning the resulting mass in water, filtering off the sulphonation products, and washing the residual anthraquinone neutral to litmus.

2. The process of recovering residual anthraquinone from a sulphonation reaction mass which comprises mixing water by degrees directly with the sulphonation mass until the sulphuric acid concentration is about 75%, drowning the resulting mass in water, filtering off the sulphonation products, and washing the residual anthraquinone neutral to litmus.

3. The process of recovering residual anthraquinone from a sulphonation reaction mass which comprises gradually adding water to said mass while maintaining it at a temperature between about 70 and 130° C., until the major portion of anthraquinone has crystallized out, and filtering off and washing the resulting crystals.

4. The process of recovering residual anthraquinone from a sulphonation reaction mass which comprises gradually adding water to said mass while maintaining it at a temperature between about 70 and 130° C., until the major portion of anthraquinone has crystallized out, drowning the diluted mass in water to cause precipitation of the remaining anthraquinone, and separating the crystallized and precipitated anthraquinone from the supernatant liquid.

5. The process of recovering residual anthraquinone from a sulphonation reaction mass which comprises gradually adding water to said mass while maintaining it at a temperature between about 70 and 130° C., until the sulphuric acid concentration is about 75%, drowning the resulting mass in water, and filtering off and washing the resulting crystals of anthraquinone.

6. The process of recovering residual anthraquinone from a sulphonation reaction mass which comprises making the ratio of sulphuric acid in said mass to dissolved anthraquinone equal to about three to one by weight, gradually adding water to the resulting mixture, while maintaining it at a temperature below 150° C., until the major portion of the anthraquinone has crystallized out, and filtering off and washing the crystals of anthraquinone.

7. The process of recovering residual anthraquinone from a sulphonation reaction mass which comprises making the ratio of sulphuric acid in said mass to dissolved anthraquinone equal to about three to one by weight, gradually adding water to the resulting mixture, while maintaining it at a temperature below 150° C., until the major portion of the anthraquinone has crystallized out, then drowning the mixture in water to precipitate the anthraquinone which has remained in solution, and filtering off and washing the anthraquinone residue.

8. In the process of recovering residual anthraquinone from a sulphonation reaction mass, the step which comprises gradually diluting the mass at a temperature below 150° C. with water to form anthraquinone crystals substantially larger than those which are formed when the sulphonation reaction mass is drowned directly in water.

9. In the process of recovering residual anthraquinone from a sulphonation reaction mass, the step which comprises gradually diluting the mass at a temperature of about 110° C. with water to form anthraquinone crystals substantially larger than those which are formed when the sulphonation reaction mass is drowned directly in water.

10. In the process of recovering residual anthraquinone from a sulphonation reaction mass containing sulphuric acid of more than 95% strength, which comprises gradually diluting the mass with water at such a rate that the sulphuric acid has a strength of about 85% at the end of one and one-half hours, and a strength of about 75% at the end of an additional half hour.

11. In the process of recovering residual anthraquinone from a sulphonation reaction mass containing sulphuric acid of more than 95% strength, which comprises gradually diluting the mass at a temperature between 70 and 130° C. with water at such a rate that the sulphuric acid has a strength of about 85% at the end of one and one-half hours, and a strength of about 75% at the end of an additional half hour.

In testimony whereof I affix my signature.

ARTHUR E. BARNARD.